United States Patent
Odake et al.

(10) Patent No.: US 7,575,175 B2
(45) Date of Patent: Aug. 18, 2009

(54) NON-CONTACT IC CARD

(75) Inventors: Ryota Odake, Tokyo (JP); Junichi Ohsako, Tokyo (JP); Hideo Kawabe, Saitama (JP); Mitsunori Ueda, Tokyo (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 10/535,344

(22) PCT Filed: Oct. 23, 2003

(86) PCT No.: PCT/JP03/13573

§ 371 (c)(1),
(2), (4) Date: Oct. 3, 2005

(87) PCT Pub. No.: WO2004/049248

PCT Pub. Date: Jun. 10, 2004

(65) Prior Publication Data

US 2006/0118638 A1    Jun. 8, 2006

(30) Foreign Application Priority Data

Nov. 22, 2002    (JP)    ............................. 2002-339854

(51) Int. Cl.
*G06K 19/06* (2006.01)
(52) U.S. Cl. ....................................... 235/492; 235/451
(58) Field of Classification Search ................. 235/379, 235/449, 451, 487, 492, 493
See application file for complete search history.

(56) References Cited

U.S. PATENT DOCUMENTS

| 5,679,939 | A | * | 10/1997 | Watanabe .................... 235/379 |
| 5,995,018 | A |   | 11/1999 | Hane et al. |
| 6,252,564 | B1 |   | 6/2001 | Albert et al. |
| 6,459,588 | B1 | * | 10/2002 | Morizumi et al. ........... 361/737 |
| 2001/0003445 | A1 |   | 6/2001 | Gauther et al. |

FOREIGN PATENT DOCUMENTS

| DE | 19633945 |   | 2/1998 |
| DE | 10035094 |   | 3/2002 |
| GB | 2275654 |   | 9/1994 |
| JP | 07-20650 |   | 4/1995 |
| JP | 2003076967 | A * | 3/2003 |
| JP | 259570 |   | 9/2003 |

OTHER PUBLICATIONS

Japanese Office Action issued on Apr. 1, 2008 in connection with Japanese Patent Application No. 11-208972.

* cited by examiner

*Primary Examiner*—Seung H Lee
(74) *Attorney, Agent, or Firm*—Sonnenschein Nath & Rosenthal LLP

(57) ABSTRACT

In a contactless IC card (1), a rectification circuit (17) rectifies an electromagnetic wave received via an antenna (10) to provide a DC voltage, and an electric double-layer capacitor (18) quickly stores the power from the rectification circuit (17). The electric double-layer capacitor (18) supplies the electric power to circuits such as a modem (11), CPU (12), memory (13), controller IC (14), driver IC (15), etc. for operation, and rewrites information for display on a display device (16) using a cholesteric liquid crystal, ferroelectric liquid crystal or the like.

6 Claims, 3 Drawing Sheets

NON-CONTACT IC CARD

TECHNICAL FIELD

The present invention relates to a contactless IC card capable of exchange information with an external data processor in a non-contact manner by an electromagnetic wave and displaying exchanged information.

This application claims the priority of the Japanese Patent Application No. 2002-339854 filed on Nov. 22, 2002, the entirety of which is incorporated by reference herein.

BACKGROUND ART

There have recently been in practical use contactless IC cards that can make information exchange with a data processor such as a reader/writer by radio communications. Such contactless IC cards are applied as a prepaid card, commutation ticket and the like in a wide range. Since the contactless IC card has not to be put in physical contact with any data processor when updating information in the card, it can advantageously be used without being taken out of its carrying case such as a wallet or the like each time.

To display information such as a balance or the like in an ordinary prepaid card, the card is passed through a puncher or printer provided in a reader/writer to punch a hole in the card itself or make a rewrite printing on the card itself. However, since the contactless IC card has not to be passed through such a reader/writer, such information cannot be displayed in such a manner.

On this account, it has been proposed to provide, in the contactless IC card, a display device such as a liquid crystal or organic EL (electroluminescence) which is to be powered by a built-in battery to display such information. In the case of this contactless IC card, however, since the display device has to always be powered from the battery to keep the information displaying, the power in the battery will gradually be decreased. To keep the information display for a long time, the battery should be replaced or recharged.

Also, a contactless IC card powered by a solar call is known from the disclosure in the Japanese Patent Application Laid Open No. 108904 of 1993, for example. However, this contactless IC card cannot display any information in a place where it is not exposed to any sufficient light.

Further, a contactless IC card using a ferroelectric liquid crystal display panel is known from the disclosure in the Japanese Patent Application Laid Open No. 154215 of 1998. Generally, the ferroelectric liquid crystal has at least two stable states in the direction of alignment, and is stabilized in one of the two states depending upon the direction of impressed electric field to have the molecules thereof kept in the direction of alignment even when the electric field is removed. Therefore, use of the ferroelectric liquid crystal display panel permits to hold the display even after no power is available.

The storage display device as disclosed in the above-mentioned Japanese Patent Application Laid Open No. 154215 of 1998, if used in a contactless IC card, takes a long time for information write and needs a high voltage and thus a relatively large power to work, the contactless IC card has to be held over a reader/writer for a longer time.

DISCLOSURE OF THE INVENTION

Accordingly, the present invention has an object to overcome the above-mentioned drawbacks of the related art by providing a contactless IC card capable of keeping a display for a long time without having to replace or recharge a built-in batter and working well with being held over a reader/writer for a reduced time.

The above object can be attained by providing a contactless IC card that exchanges information with an external data processor in a non-contact manner by an electromagnetic wave, the device including according to the present invention:

a rectifying means for rectifying an electromagnetic wave sent from the data processor;

an electric double-layer capacitor for storing a rectified output from the rectifying means;

a controlling means for controlling the information exchange with the data processor and the display of information received from the data processor; and a displaying means having a storing function to hold the display even after power supply is stopped and which displays the information under the control of the controlling means, the electric double-layer capacitor supplying each component of the contactless IC card with a power provided through storage of the rectified output.

In the above contactless IC card according to the present invention, the electromagnetic wave sent from the external data processor is rectified by the rectifying means, the rectified output thus provided is stored into the electric double-layer capacitor, and the power stored in the electric double-layer capacitor is used to select information to be displayed on the displaying means, for example.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below concerning the embodiment thereof with reference to the accompanying drawings. The embodiment is an application of the present invention to a contactless IC card that exchanges information with a reader/writer as an external data processor in a non-contact manner by an electromagnetic wave and displays the exchanged information.

Figure 1:
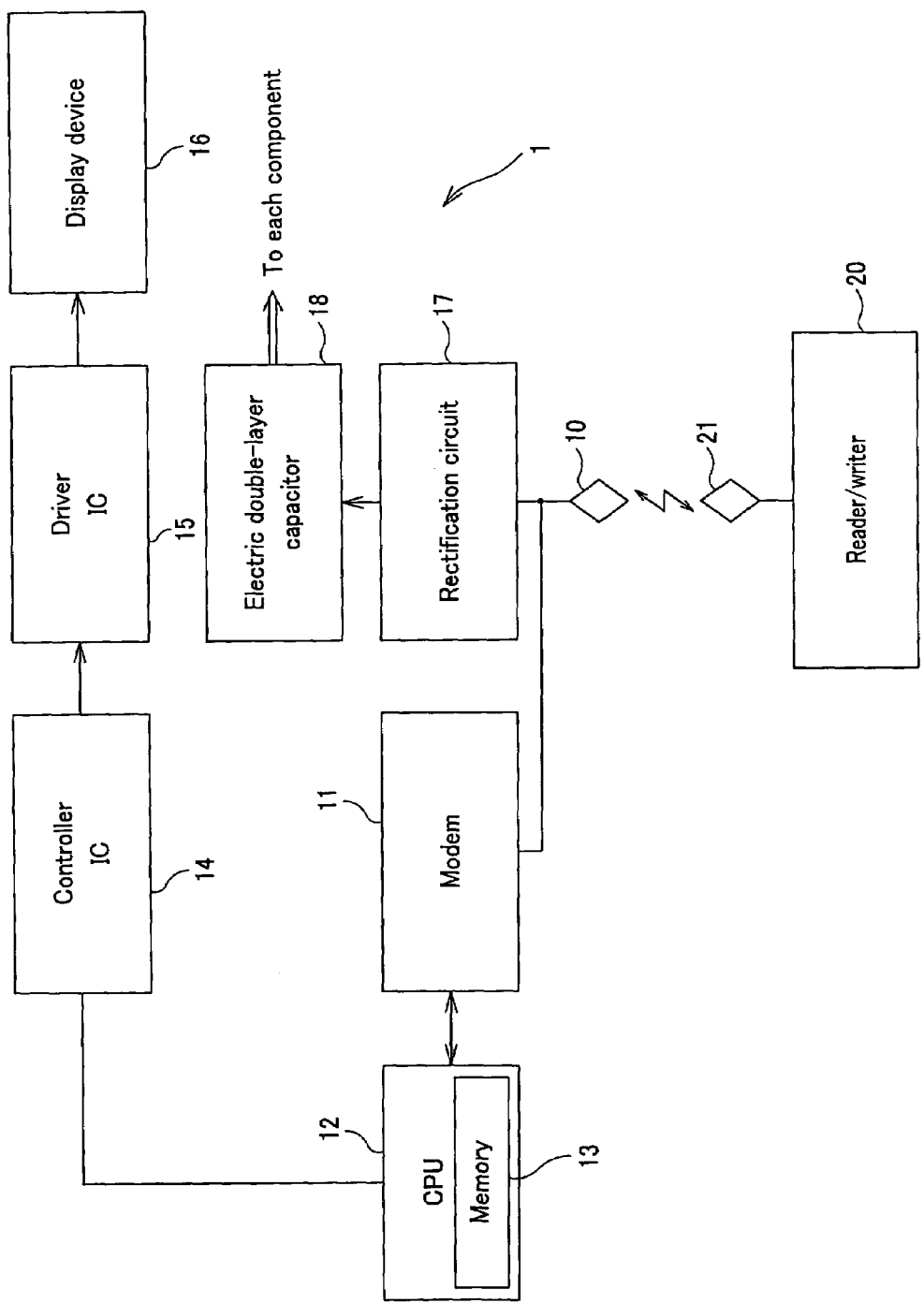
FIG. 1 schematically illustrates the internal configuration of the contactless IC card according to the embodiment of the present invention.

Referring now to FIG. 1, there is schematically illustrated the internal configuration of the contactless IC card according to the embodiment. It should be noted that FIG. 1 also illustrates a reader/writer 20 and antenna 21 of the latter together with the contactless IC card, generally indicated with a reference numeral 1. The reader/writer 20 can make communications with a host computer not shown as necessary.

FIG. 1 also shows an antenna 10 of the contactless IC card 1 and a modem circuit 11. As shown, the antenna 10 receives an electromagnetic wave sent from the antenna 21 of the reader/writer 20, and the modem circuit 11 demodulates the received signal and supplies it to a CPU 12 also included in the contactless IC card 1. The CPU 12 interprets a command included in the demodulated signal and processes data following the command according to the command.

For example, in case the processed command is a read command to a memory 13 included in the CPU 12, the CPU 12 will read data stored in the memory 13, the modem circuit 11 modulates the data and the antenna 10 sends it as an electromagnetic wave. On the other hand, in case the processed command is a write command to the memory 13, the CPU 12 will write the demodulated data into the memory 13. Also, the command is a data display command, the CPU 12 will supply the data to a controller IC 14 included in the contactless IC card 1. The controller IC 14 controls a driver IC 15 also included in the contactless IC card 1 to display data supplied from the CPU 12 on a display device 16 as a component of the contactless IC card 1.

In case the contactless IC card 1 is used as a prepaid card, the user prepays a certain amount of money and stores the money amount into the memory 13. Each time the user of the contactless IC card 1 buys an item or items, the IC card is placed over the reader/writer 20 which will make a process of payment, At this time, information including a charged amount of money, balance and the like will be displayed on the display device 16.

In this embodiment, the display device 16 is of a storage type using a cholesteric or ferroelectric liquid crystal. The cholesteric or ferroelectric liquid crystal is a bi-stable liquid crystal having at least two stable states in the direction of alignment of its molecules. One of the stable states will be selected depending upon the direction of an applied electric field, and the liquid crystal molecules will be kept aligned in that direction even when the electric field is removed. Therefore, use of such a storage type display device permits to hold data once stored semi-permanently.

The contactless IC card 1 also includes a rectification circuit 17 which rectifies the electromagnetic wave supplied via the antenna 10 into a DC voltage and supplies the power to an electric double-layer capacitor 18 also included in the contactless IC card 1. The electric double-layer capacitor 18 can instantaneously be charged. It can electrically be isolated from outside after the charging and thus hold an electric energy for more than several days. The electric double-layer capacitor 18 supplies the electric energy to the circuits such as the modem circuit 11, CPU 12, memory 13, controller IC 14, driver IC 15, etc. for operation, and rewrites information for display on the display device 16.

Figure 2:
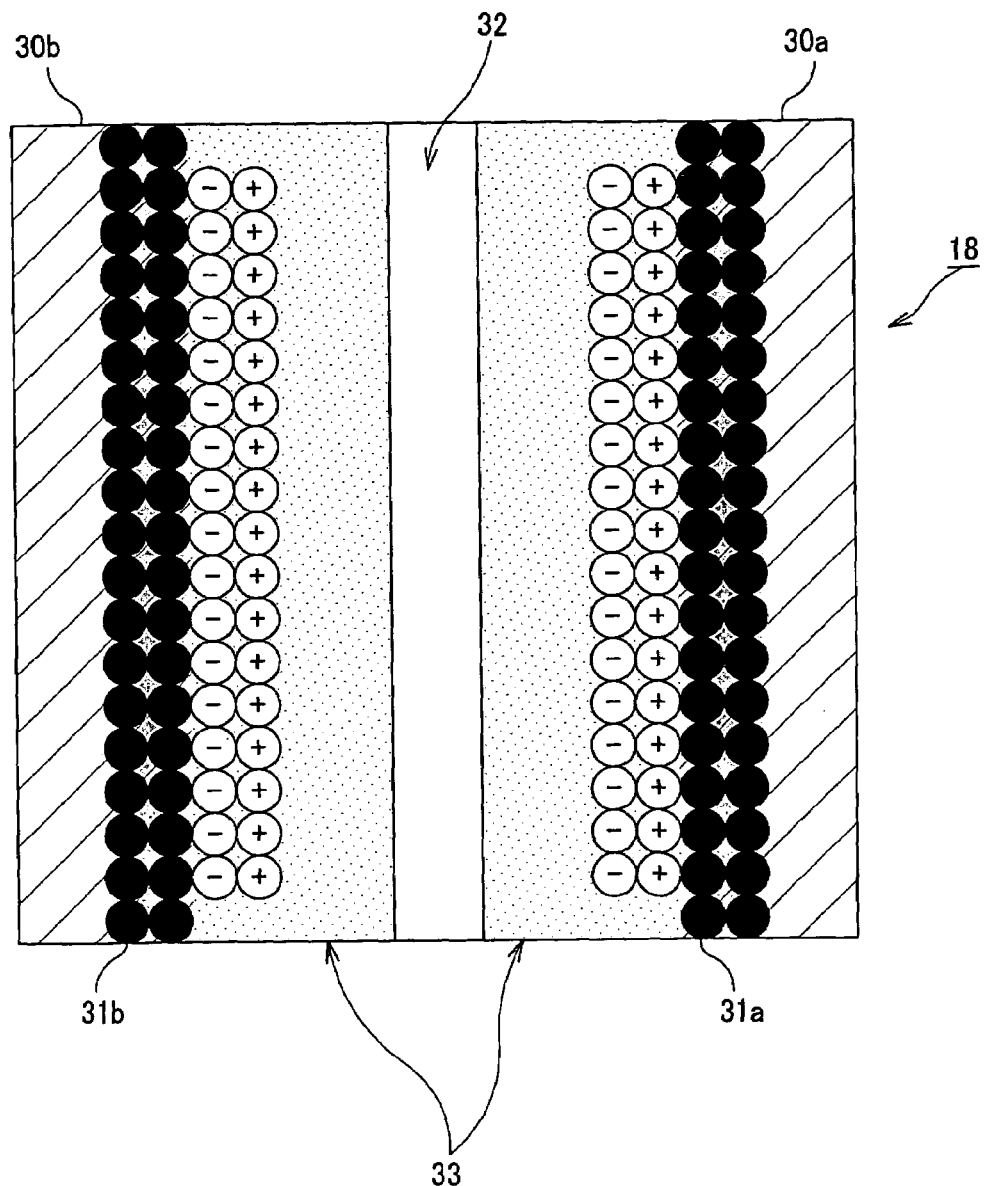
FIG. 2 schematically illustrates the configuration of the electric double-layer capacitor used in the contactless IC card in FIG. 1.

FIG. 2 schematically illustrates the electric double-layer capacitor 18. As shown, the electric double-layer capacitor 18 includes an aluminum-made collector electrodes 30$a$ and 30$b$ each of about 20 μm in thickness, activated charcoal layers 31$a$ and 31$b$ each of several tens μm in thickness, provided on the aluminum-made collector electrodes 30$a$ and 30$b$, respectively, a paper separator 32, and an electrolyte 33 filled therein. The electric double-layer capacitor 18 is sealed with an aluminum sheet (not shown).

When a DC voltage is applied between the activated charcoal layers 31$a$ and 31$b$, the activated charcoal layer 31$a$ polarized to have a positive polarity will attract negative ions, while the activated charcoal layer 31$b$ polarized to have a negative polarity will attract positive ions, both electrostatically. Thus, an electric double layer will be formed over the boundaries between the activated charcoal layers 31$a$ and 31$b$ and the electrolyte 33, respectively. The electric double-layer capacitor 18 can store electric charges in the electric double-layer areas to provide a capacitance more than one thousand larger than that of an electrolytic capacitor. Namely, the capacitor 18 can have a large capacity in units of farad (F).

Note that the rated voltage of this electric double-layer capacitor 18 depends upon the electrolytic voltage of the electrolyte 33. The rated voltage ranges from about 2.3 V to 2.5 V. With a plurality of the electric double-layer capacitors 18 being connected in series to each other, charging can be made at a voltage an integral number of times higher. Also, since the electric double-layer capacitor 18 can be formed to have an entire thickness of 0.5 mm or less, it can be built in a contactless IC card whose thickness is 0.9 mm or less, for example, with no difficulty.

For example, a 0.001-F electric double-layer capacitor 18 is charged as will be described below. When an output from the reader/writer 20 is supplied to a coil (not shown) of the rectification circuit 17 in the contactless IC card 1, there will occur an electromotive force of about 5 V/20 mA. When a 20-mA constant-current charging circuit is connected to the capacitor 18, charging will be made from 0 V to 3.3 V in a time $T_c$ of 0.165 sec as given by the following equation (1). In this case, an electric energy $E_c$ of 0.00545 W as given by the following equation (2) will be stored in the electric double-layer capacitor 18:

$$T_c = CV/I = 0.001 \text{ (F)} \times 3.3 \text{ (V)}/0.02 \text{ (A)} = 0.165 \text{ (sec)} \quad (1)$$

$$E_c = CV^2/2 = 0.001 \text{ (F)} \times 3.3 \text{ (V)}/3.3 \text{ (V)}/2 = 0.00545 \text{ (W)} \quad (2)$$

In case the display device 16 is an LCD (liquid crystal display), a necessary energy for writing information should be considered based on the charging and discharging up to the capacity of the LCD. On the assumption that the LCD capacity is at most about 0.01 μF/cm² and 20 V is necessary as the drive voltage, the energy $E_L$ required for rewriting a display area S of 10 cm² will be 0.00002 W or so as given by the following equation (3):

$$\begin{aligned} E_L &= SCV^2/2 \\ &= 10 \text{ (cm}^2) \times 0.01 \times 10^{-6}(F) \times 20(V) \times 20(V)/2 \\ &= 0.00002(W) \end{aligned} \quad (3)$$

The above is about 1/250 of the electric energy $E_c$ stored in the electric double-layer capacitor 18. Namely, the electric energy $E_c$ in the electric double-layer capacitor 18 is sufficient for the information rewriting.

Also, since the time required for information write is short, the electric energy $E_c$ from the electric double-layer capacitor 18 is sufficient to operate the modem circuit 11, CPU 12, memory 13, controller IC 14, driver IC 15, etc. for the information write.

On the other hand, the display device 16 formed from a cholesteric liquid crystal will take a longer time for rewriting the display than the ordinary liquid crystal. The time is about 10 msec per line. Therefore, in case the time for which the contactless IC card 1 receives the power from the reader/writer 20 is as short as 0.2 sec for example, only a maximum of 20 lines can be rewritten for that length of time.

On this account, in this contactless IC card 1 according to this embodiment, the electric energy is stored in the electric double-layer capacitor 18 for the short time for which the contactless IC card can receive the power from the reader/writer 20, and the electric energy is used to rewrite information for display on the display device 16 for a longer length of time than the time for which the contactless IC card 1 receives the electric energy.

Figure 3:
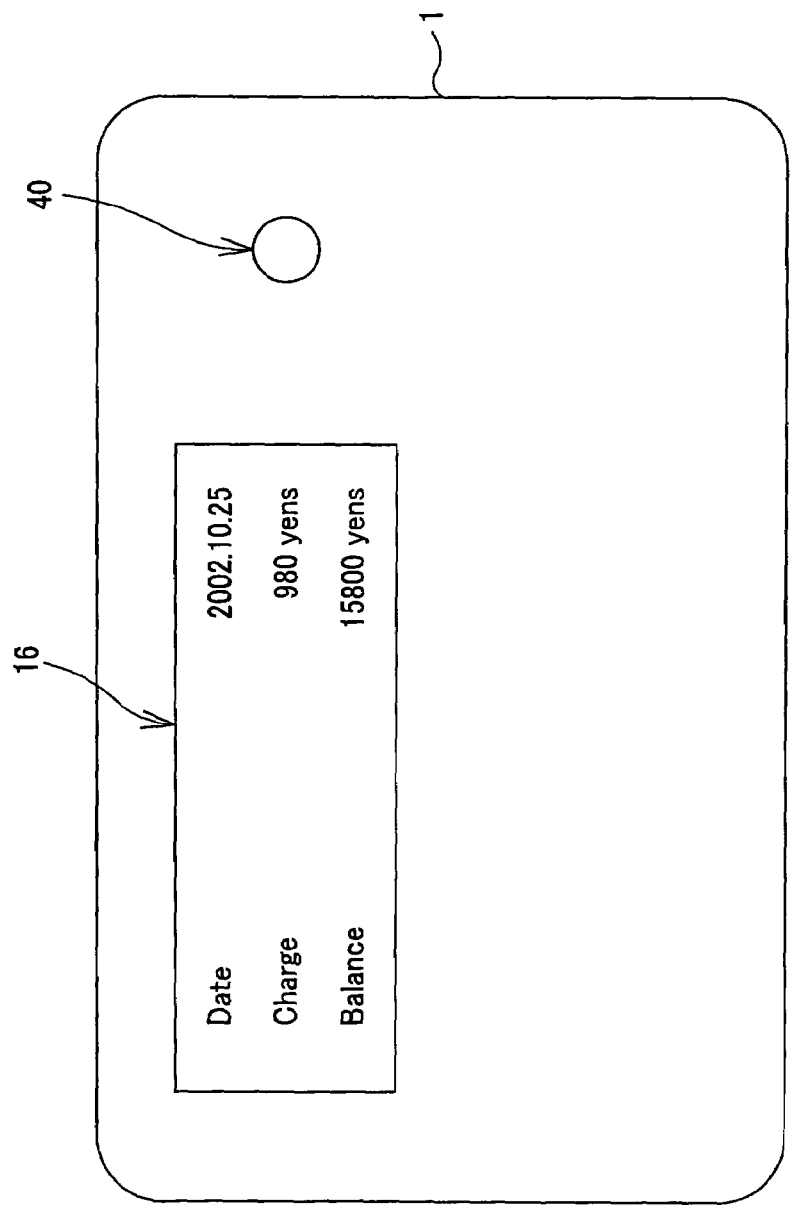
FIG. 3 shows an example of the button provided on the contactless IC card in FIG. 1.

In the above example, the electric double-layer capacitor 18 has charged therein by one try an electric energy about 250 times larger than the power required for the information rewriting. So, even if the display data once written in the contactless IC card is destroyed due to a shock or bending, it can be restored by pressing a button 40 provided on the contactless IC card 1, as shown in FIG. 3, to give a re-write command to the contactless IC card 1. Also, use of the button 40 permits to select and display other data stored in the memory 13.

As above, since the contactless IC card 1 according to this embodiment uses the display device 16 which is a storage-type display device using a cholesteric or ferroelectric liquid crystal, data for display on the display device 16 can be held semi-permanently.

Also, the storage-type display device requires a time for rewrite of the display data as mentioned above. However, the time required for placing the contactless IC card 1 over the reader/writer 20 can be reduced by quickly storing the electric energy into the electric double-layer capacitor 18 and rewriting the display data with the electric energy.

Further, since the electric double-layer capacitor 18 can be charged quickly for a time of 0.1 sec or less, and can be charged and discharged repeatedly at a rate of 100,000 cycles or more, it needs no such a length of time as required for replacing or charging a rechargeable battery and does not easily get out of order because the contactless IC card 1 is handled in a completely noncontact manner.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

According to the present invention having been described in the foregoing, an electromagnetic force sent from an external data processor is rectified into a DC voltage, the DC voltage is stored in an electric double-layer capacitor, and the power thus stored in the electric double-layer capacitor is used to select information to be displayed on a display means, for example. Therefore, the information can be rewritten just with the contactless IC card placed over a reader/writer for a reduced time.

The invention claimed is:

1. A contactless IC card that exchanges information with an external data processor in a non-contact manner by an electromagnetic wave, the contactless IC card including:
   a rectifying unit for rectifying an electromagnetic wave sent from the data processor;
   an electric double-layer capacitor for storing a rectified power supplied from the rectifying unit;
   a controlling unit for controlling the information exchange with the data processor and the display of information received from the data processor;
   a displaying unit having a storing function to hold the display even after power supply is stopped and which displays the information under the control of the controlling unit; and
   an information selecting unit physically operable by a user for selecting information to be displayed on the displaying unit from the information stored in a storage unit,
   wherein,
   the electric double-layer capacitor is configured to store, for a shorter time than a time required for writing information, a sufficient power for supply to each component of the contactless IC card until the information is completely written to the displaying means under the control of the controlling unit.

2. The contactless IC card according to claim 1, wherein the displaying unit is a liquid crystal display unit having at least two stable states of alignment of liquid crystal molecules thereof and takes one of at least the two stable states of alignment of the liquid crystal molecules to display the information.

3. The contactless IC card according to claim 2, wherein the liquid crystal is a ferroelectric or cholesteric one.

4. The contactless IC card according to claim 1, wherein the storage unit is configured for storing information received from the data processor.

5. The contactless IC card according to claim 1, wherein the electric double-layer capacitor is designed to store, in a time of 0.165 sec or less, a sufficient power for supply to each component of the contactless IC card until the information is completely written.

6. The contactless IC card according to claim 1, having a thickness of 0.9 mm or less.

* * * * *